United States Patent [19]

Earle

[11] Patent Number: 5,262,942
[45] Date of Patent: Nov. 16, 1993

[54] FINANCIAL TRANSACTION NETWORK

[75] Inventor: Dennis M. Earle, Secaucus, N.J.

[73] Assignee: Bankers Trust Company, New York, N.Y.

[21] Appl. No.: 533,649

[22] Filed: Jun. 5, 1990

[51] Int. Cl.⁵ .................. G06F 15/20; G06G 7/52
[52] U.S. Cl. .............................. 364/408; 395/925
[58] Field of Search ............ 364/408, 225, 918, 918.2, 364/918.9, 401; 395/925

[56] References Cited

U.S. PATENT DOCUMENTS

| | | | |
|---|---|---|---|
| 4,334,270 | 6/1982 | Towers | 364/408 |
| 4,823,265 | 4/1989 | Nelson | 364/408 |
| 4,903,201 | 2/1990 | Wagner | 364/408 |
| 4,953,085 | 8/1990 | Atkins | 364/408 |
| 5,101,353 | 3/1992 | Lupien et al. | 364/408 |
| 5,126,936 | 6/1992 | Champion et al. | 364/401 |
| 5,132,899 | 7/1992 | Fox | 364/408 |

OTHER PUBLICATIONS

"Software Packages Assist Diverse Needs of Bond Portfolio Managers", Wall Street Computer Review, Jun. 1985, pp. 61-65.

Primary Examiner—Roy N. Envall, Jr.
Assistant Examiner—Laura Brutman
Attorney, Agent, or Firm—Sughrue, Mion, Zinn Macpeak & Seas

[57] ABSTRACT

A financial transaction network employs a shareholder network serviced by a host processor. The financial network maintains (n) number of mutual fund portfolios operating in different currencies. The host processor acts a communications switch validating incoming transaction requests and routing them to a central Transfer Agent system for execution. The host processor maintains central records that can be queried through the host. The Transfer Agent is responsible for updating the database. The financial network provides accessibility, speed and finality of settlement in transactions by using mutual fund shares in diverse currencies as substitutes for those currencies.

23 Claims, 10 Drawing Sheets

| Bankers Trust | Regular Purchase | Ver: 0.1 |

Account Name: _____
                                    Account #: _____
                              Trans. Type Code: _____

[ ] Purchase in Pool
    Portfolio: _____  Amount: _____

[ ] Receive Funds From
    Bank Name: _____  Bank ID: _____
    DDA Name: _____   DDA Account #: _____

Client Reference Number: _____

Add  Change  Delete  Next  Previous  First  Last  Goto  Search  eXit
Add a new record Esc: eXit   F3: Main

FIG. 6B

| Bankers Trust | Matched Transfer | Ver: 0.1 |

Account Name: _____
                                    Account #: _____
                            Trans. Type Code: _____
                                    Account #: _____

[ Transfer to Counter Party ]
Portfolio: _____     Number of Shares: _____
                                        Old or New: _____

[ Receive From Counter Party ]
Portfolio: _____     Number of Shares: _____
                                        Old or New: _____

Client Reference Number: _____
The above number must exactly match the counterparty's reference number.

Add  Change  Delete  Next  Previous  First  Last  Goto  Search  eXit
Add a new record Esc: eXit    F3: Main

FIG. 6C

Bankers Trust     Receive and Redeem     Ver: 0.1

Account Name: _____
                         Account #: _____
                         Trans. Type Code: _____

[ ] Redeem Shares
     Portfolio: _____
     Expiration Time: _____     Number of Shares: _____

[ ] Send Proceeds To
     Bank Name: _____     Bank ID: _____
     DDA Name: _____     DDA Account #: _____

Client Reference Number: _____

Add    Change    Delete    Next    Previous    First    Last    Goto    Search    eXit
Add a new record Esc: eXit    F3: Main

FIG. 6D

FINANCIAL TRANSACTION NETWORK

BACKGROUND OF THE INVENTION

This invention relates to financial systems and, in particular, to an international data processing network which provides accessibility, speed, and flexibility in effecting payments 24 hours a day in and among multiple national currencies, such as, but not limited to, U.S. Dollars, Japanese Yen, and British Pounds Sterling. This invention is also directed to a set of mutual fund portfolios used to effect currency payment transactions to settle transactions which require such currency payments as fulfillment of an obligation. This invention is further directed to a set of mutual fund portfolios used to initiate and settle transactions which exchange value between national currencies, similar to foreign exchange.

In general, investors purchasing shares in a typical mutual fund transfer assets, such as cash, to the account of the mutual fund at a custodial institution (custodian). If the mutual fund is closed-ended, there is a limit to the number of shares which the mutual fund may issue. Conversely, if the mutual fund is open-ended, there is no limit to the number of shares which the mutual fund may issue. The mutual fund's investment advisor uses those assets transferred to it by an investor to invest in securities or other approved investments as allowed by the mutual fund's prospectus, although typically a fund will maintain a portion of its assets in cash and cash equivalents. The mutual fund's transfer agent issues to the investor the number of shares equivalent to the value of the assets transferred to the fund by said investor divided by the price of a share in the mutual fund. At this point, the investor becomes a shareholder. The price of the share is determined by the aggregate of the current market value of the mutual fund's assets and the income earned by these investments, less accrued management fees and expenses. Most mutual funds instruct their fund accountants to calculate this share price which is called a net asset value calculation, once a day. This is done by obtaining current market prices for each investment held by the fund. Investors may only purchase shares or redeem shares at a share pricing. When a shareholder redeems some number of shares, to the extent that the fund does not have cash on hand, the investment advisor sells a portion of the mutual funds assets in order to pay said shareholder the value of his shares as determined by the fund price.

There exists a multitude of mutual fund arrangements which allow shareholders to purchase and redeem open-ended shares together with limited rights of third-party purchase, also called share transfer (that is the change of ownership of a share in a portfolio from one owner of record to another), and limited rights of exchange (that is the movement of wealth from one portfolio to another by the same shareholder). Such mutual funds generally exist either as a single, or a group, of portfolio(s) denominated in one national currency, such as U.S. Dollars. For example, in a group of mutual fund portfolios, one portfolio may be invested in technology companies whereas another portfolio may be invested in energy companies. Thus, typical mutual funds earn profits and have losses based on this national currency. Furthermore, there are still other mutual funds which hold assets denominated in more than one national currency. These mutual funds earn profits and experience losses based on each currency in which its investments are denominated.

The art is replete with various concepts involving the use of mutual funds for purposes of cash money management. Additionally, these systems use the same data processing system associated with the mutual fund to provide ancillary services such as brokerage accounts, credit card services and the like. Reference is made to U.S. Pat. No. 4,346,442, which describes a cash money management scheme that is constructed around the architecture of a short term money market fund that invests free cash and uses funds in the money market for purposes of payment of charge card transactions and the like. The fund relates to only one national currency.

Reference is made to descriptions in the literature which describe alternative uses of mutual fund shares including: Gorton, Gary and George Pennacchi ("Financial Intermediation and Liquidity Creation", Journal of Finance, volume 45 number 1, March 1990) and Jacklin, Charles. J. (Working Paper, Stanford University, "Demand Equity and Deposit Insurance", April 1990).

However, mutual fund shares are not currently used through effecting share transfers for purposes of paying for goods, services, and other financial obligations such as meeting collateral requirements common for good faith deposits, securities trades, and other credit requirements. Mutual fund shares are also not used today for settling foreign exchange transactions.

The international financial community today operates using numerous national currencies and with them, distinct systems, rules, procedures and laws for currency payments for settlements of obligations within the country issuing that currency. Most rely on the country s central bank, such as the Federal Reserve in the United States, to guarantee that once a payment is made, it is irreversible. The timing of this guarantee which is called finality of payment, varies by country and by system and may be immediate, at the close of the business day, sometime the following business day, or later. This guarantee, and the execution of transactions, is dependent upon the operating hours of the central bank and the wire system. Thus, there exist within the financial community acute problems and risks when making payments in a particular country when the transfer of the underlying currency of the transaction is not supported by that country's financial system and its central bank.

Furthermore, this fragmentation of financial systems hinders the ability to change the value of the wealth held in one national currency into another national currency. The foreign exchange market is used for this purpose, but carries with it certain costs, delays in money availability and risk. In addition, there are similar problems when moving money within a national currency such as moving U.S. Dollars through the Federal Reserve Bank's Fedwire system, an internal mechanism within the Federal Reserve system to transfer currency which provides immediate finality of payment. Fedwire encompasses several Federal Reserve Bank districts, based on geographical area of the country, each with operational jurisdiction over its node of the Fedwire system. Moving money from one Federal Reserve district to another Federal Reserve district utilizing Fedwire may be subject to delay because it must pass through several nodes. Moreover, the transactions are conducted via the Federal Reserve wire which has at critical times failed. A noteworthy example of a failure(s) of the Federal Reserve wire occurred during the October 1987 stock market collapse.

This shortcoming is not limited to the United States. Other networks exist, not necessarily Government sponsored, for foreign currencies such as CHAPS for Pound Sterling and the Bank of Japan for Yen.

To date, there are no systems in effect or proposed which employ the mutual fund architecture such that issued shares can be used as currency equivalents to alleviate these problems of currency infungibility and the dependence on the central bank for payment movement and payment finality.

Within the business community there is an acute requirement for immediate currency availability to clear and settle transactions, such as in, but not limited to, the field of futures contracts. Futures trading is predicated on deposit and payment of required margins. These include an initial margin payment as a good faith deposit, set as a proportion of the value of a futures contract. Each counterparty (side) to a futures trade pays this initial margin to a clearing house through a clearing member on the day following the trade day. This initial margin is held throughout the life of the contract. The price of the contract fluctuates throughout its life.

These fluctuations in contract price give rise to a requirement for a variation margin, which is required once or twice a day by the counterparty against whom the price has moved. This "losing" party must deposit increased collateral with the clearing house to maintain the contract. This collateral is then transferred immediately to the party in whose favor the price has moved.

As an example, at the Chicago Mercantile Exchange, initial margins are called for at 6:40 a.m. CST on the day following the trade date. Variation margins are also called for at 6:40 a.m. CST and at 3:00 p.m. CST every day throughout the life of the contract, every day starting the day following the trade. Payment for initial margin requirements is generally based on deposit of interest bearing treasury securities, letters of credit or cash. Requirements for variation margin are always paid in cash. There is a time lag between the time this requirement is known until the time the payments can be made, because the United States payment systems are closed at 6:40 a.m. CST. Additionally, these payments are subject to the operating procedures of each bank involved in the process. Which may delay availability of funds and introduce additional costs. These two situations cause the execution of margin payments to occur three to four hours later than is optimal from the clearing house s perspective.

Furthermore, there is no way to pay for margin during U.S. business hours in a currency other than the U.S. Dollar. Because U.S. clearing houses prefer to be paid in the same currency as that in which the price of the futures contract is expressed, the inability to move national currencies other than the U.S. Dollar with immediate finality of payment within the U.S. business day has been a hindrance to the development of such non-dollar denominated contracts. In addition, there is no payment/wire system or network in which clearing houses, and trading firms can make U.S. Dollar payments to each other without using a bank for access to the system.

Yet another example of delays and costs associated with currency transactions is a simple foreign exchange transaction, such as from U.S. Dollars to Japanese Yen. An institution typically wishing to make such an exchange currently requires the intervention of at least two banks, a bank in the United States to initiate the transfer in dollars and a receiving bank in Japan to receive and transfer the converted funds to the Yen account. Multi-day delays for fund availability are common even in the case of wire transfers. The requirement that multiple banks be used increases fees.

Furthermore, since the two sides of the transaction are not effected within the same financial system, there is an opportunity for loss, whereby the Yen transaction is accomplished but the companion U.S. Dollar transaction is not. Thus, there exists a need within the financial community for a vehicle by which currency transactions and exchanges can be made on a timely, reliable and synchronous basis.

In the evolving global economy, a variety of problems continue to exist associated with the use of multiple national currencies. These problems can range from the extreme of currencies which are not convertible, such as the ruble in the U.S.S.R., to merely issues of inconvenience.

SUMMARY OF THE INVENTION

Given these problems with existing financial systems, it is an object of this invention to provide a network which allows for the use of mutual fund shares as currency equivalents in the clearing and settling of commercial transactions.

Yet another object of this invention is to provide a financial transfer network that permits the purchase and transfer of mutual fund shares based on one or more currency portfolios managed in a common fund.

A further object of this invention is to define an international financial transaction network which permits foreign exchange transactions to be predicated on an exchange of mutual fund shares which exist in parallel portfolios each based on a different currency irrespective of the issuer of the currency.

An important object of this invention is to provide a financial exchange network which substitutes mutual fund shares for currency which guarantees collateral and permits more immediate finality of settlement of obligations in financial markets, such as, but not limited to, futures, options and the like.

A further object of this invention is to define a network mechanism which allows shareholders to negotiate share exchanges outside the fund yet use the vehicle of the fund for transfers of shares.

Still another object of the invention to is provide a financial network that maintains records on the network data base managed centrally by the mutual fund in which relationships among accounts may be maintained.

An object of this invention is to establish a financial network that provides a medium of exchange for otherwise non-convertible currencies.

These and other objects of this invention are achieved by means of a financial transaction network that employs one or a number of single currency portfolios tied together in one or more mutual funds which operate using substantially a 24 hour system. Country of registration of the fund(s) does not relate to the performance of the invention. Independent currency portfolios are maintained and managed, generally in the country which issues that currency. The independent portfolios are tied together by a 24 hour host processor providing client service and administration together with a transfer agent in charge of maintaining record ownership and a fund accountant in charge of calculating net asset value. Portfolios are priced at intervals approaching continuous pricing, such as every two hours, which is more frequently than any other money market mutual fund. With this frequent pricing structure the investor may purchase and redeem shares more frequently than he can in a typical mutual fund. However, share transfers may occur at any time. With this pricing mechanism, the mutual fund is tied closely to its custodian(s) for the purposes of notification of incoming funds. Once a day, each portfolio distributes its earnings pro rata to its shareholders in the form of share dividends. In this way, the price of the share is maintained at a constant net asset value.

Given this basic architecture, a shareholder may buy shares in any of the currency portfolios maintained by the network. That is, in the example of U.S. Dollars. Japanese Yen and British Pounds, a shareholder may purchase and redeem shares in any available portfolio with the currency of that portfolio. Transactions between shareholders can take multiple paths in the network. Within any single currency portfolio, shares can be transferred from an account of one shareholder to that of another shareholder. This is called a third party purchase, or a share transfer. Thus, by transferring shares within the U.S. Dollar portfolio, U.S. Dollar equivalent payments are made without the requirement of a bank. This feature is particularly useful in the settlement of financial market contract settlement obligations, such as those in the futures markets, which require payments when banks are not open.

Another transfer mechanism is one which allows for private currency exchanges to be made between two shareholders utilizing the vehicle of fund shares as the transfer mechanism. For example, one shareholder has U.S. Dollar shares and another shareholder has Yen shares. They decide to "swap" or trade their holdings, and both parties notify the mutual fund of their intentions. The mutual fund effects this by transferring a specified number of the first shareholder's U.S. Dollar shares to the other shareholder while simultaneously transferring a specified number of Yen shares from the other to the first shareholder. This share transfer mechanism is also useful for the transfer of value as represented by otherwise non-convertible currencies.

Within the mechanism a shareholder may also move funds from one portfolio to another by redeeming shares in one portfolio and using the proceeds to fund a traditional foreign exchange transaction in which he obtains the currency of the second portfolio, and then, using the second currency purchases shares in the second portfolio.

Access to the financial network would be, generally, a workstation with dedicated software to provide access into a client service and administration system. The financial network also includes a bulletin board feature whereby shareholders can list expressions of interest to "swap" shares with other shareholders. If the two shareholders agree to a swap, they each instruct the client service and administration host processor of the settlement information for the swap. The financial network also includes multilevel directories to provide accounting data at various levels (portfolio, house, customer, etc.). A centralized transfer agent system operates in conjunction with the client service and administration system for purposes of facilitating transfers of shares in all of the portfolios.

Consequently, this financial network acts like a demand deposit account permitting deposits in the form of purchases and withdrawals in the form of redemptions. The portfolios pay dividends in the form of interest to share holders. The financial network permits movement within a currency in the form of share transfers which are equivalent to money transfers within a denominated currency and additionally, movement between currencies by portfolio exchange and by matched transfers. The latter is equivalent to a foreign exchange transaction.

This invention will be described in greater detail by referring to the attached drawing and the description of the preferred embodiment that follows.

BRIEF-DESCRIPTION OF THE DRAWING

FIGS. 6A–6E illustrate sample menus and screens used in accordance with this invention.

DESCRIPTION OF THE PREFERRED EMBODIMENT

Figure 1A:
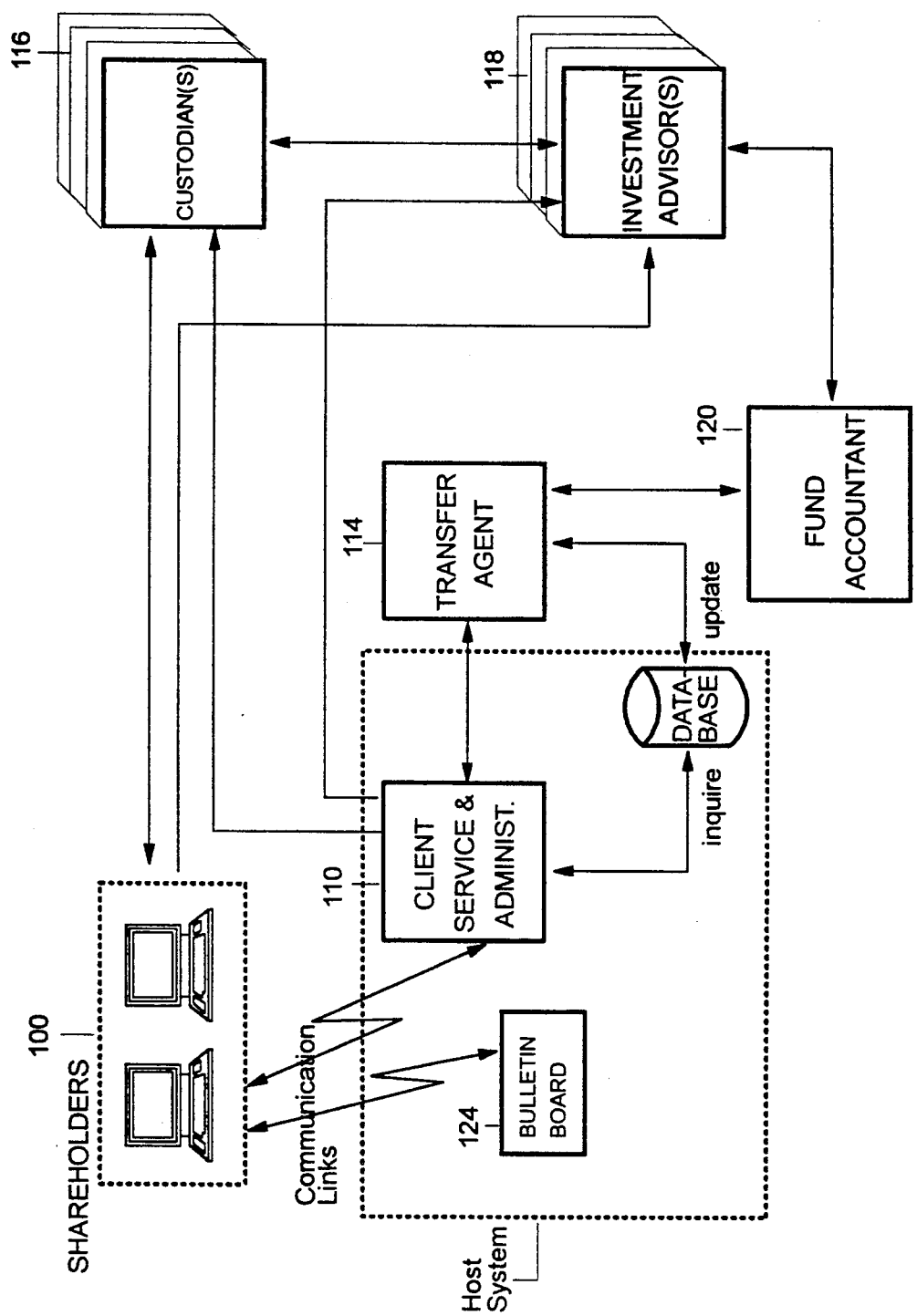
FIGS. 1A and 1B are flow charts illustrating the system components of the financial transaction network in accordance with this invention.
Figure 1B:
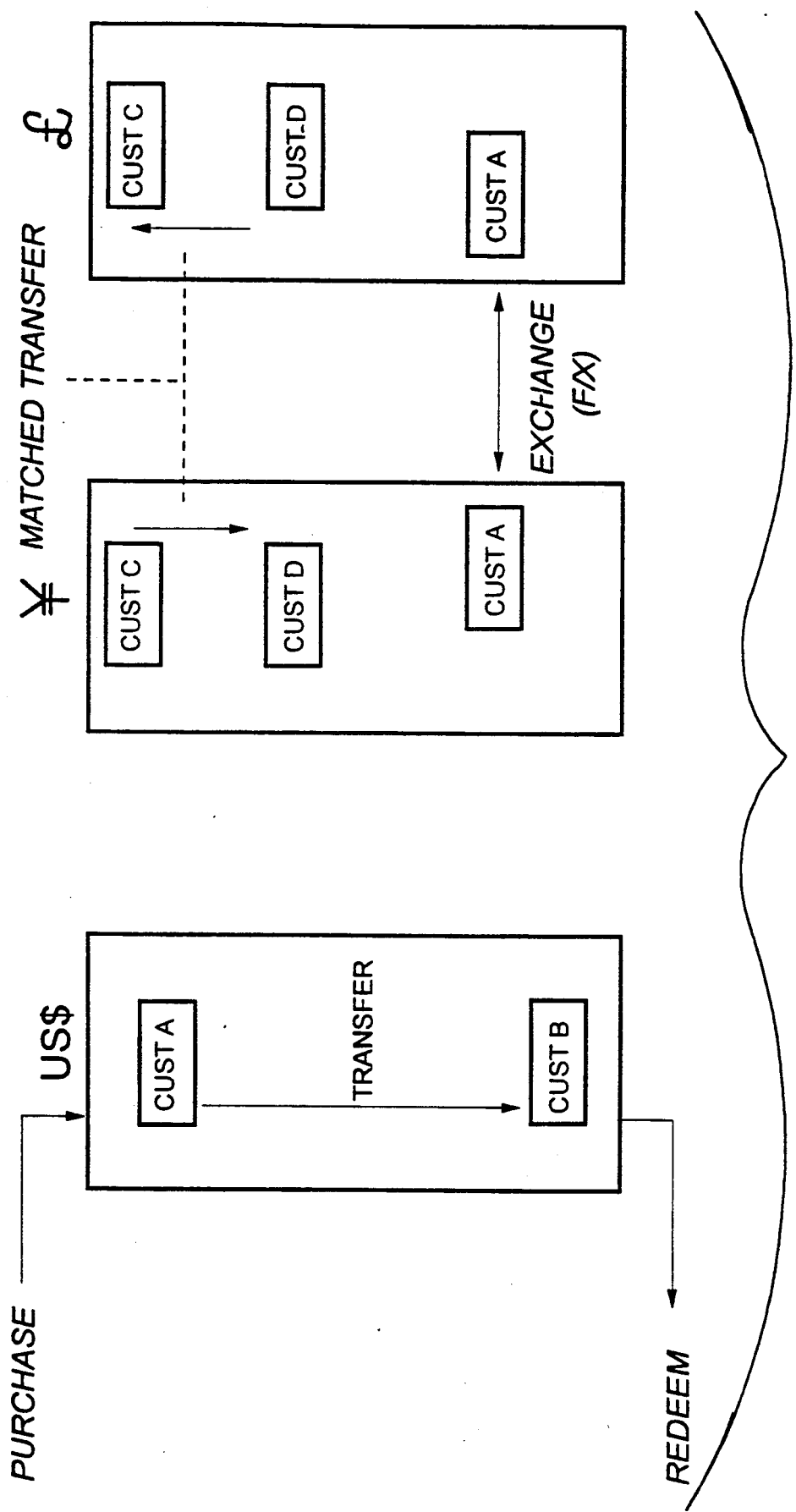

Referring now to FIGS. 1A and 1B, the basic architectural aspects and relationships of this financial network are depicted. Access to the financial network is achieved through a user workstation 100 located at each customer site. Dedicated software featuring a menu driven system with multiple levels of security, formatted screens for data input, and local editing capability is provided for the workstation 100. The ability to format and transmit instructions, receive confirmations from the host system, and make inquiries to a customer mailbox is provided from the user workstation 100. Thus, the workstations are used by shareholders for data entry, to receive confirmations and to make inquiries regarding transaction status to the financial transaction network.

Communication with the financial transaction network is established from the remote user workstation 100 to a Client Service and Administration (CSA) system 110. This system, which is the hub of the financial network, invokes security routines to insure authorized access to the system and acts to validate, accept or reject, and route all transactions to their appropriate destinations. Additionally, account information, confirmations and status messages are sent to shareholder mailboxes which are maintained by the CSA system 110. It performs administrative tasks, such as assigning transaction numbers to instructions, holding transactions in a pending queue awaiting acknowledgement of further information to complete the transaction and performing additional functions within the financial network. The CSA system may use fault tolerant computer technology. It will be appreciated that a variety of computer technologies are feasible. The invention will be defined in detail by referring to specific transactions.

A communication link is established between the Client Service and Administrative system 110 and a Transfer Agent system 114. The Transfer Agent system executes all transactions and acts within the financial network for purposes of updating shareholder records, applying dividends to fund shares and transmitting netted purchase and redemption information to the Fund Accountant. Additionally, the Transfer Agent provides account balance information and transmits transaction statements and a hard copy of transaction confirmations to the shareholder, as required by law. Thus, the Transfer Agent system 114 performs shareholder recordkeeping and acts in an informational capacity by maintaining and dynamically transmitting updated shareholder record information such as account balance to update the CSA database 112. The database 112 is subject to inquiry by client service and administrative system 110. As illustrated in FIG. 1A thus functionality is limited to inquiry, that is, the data base 112 cannot be altered in any way by the Client Service and Administration system. Shareholder accounts maintained in the data base 112 are updated only by the Transfer Agent system 114.

This invention further employs Custodians 116 located at different international locations. It will be understood that an alternative is a central global custodian and plural sub-custodians. The Custodian(s) maintains custody of the mutual fund's assets including those located outside the United States. The Custodian(s) 116 receives shareholder assets for the purchase of shares, and disburses assets to the shareholder for redemptions. The Custodian(s) also accepts instructions from the CSA to await receipt of good funds from purchasing shareholders. There are (n) custodians, one located in each country as caveated above. While three funds are illustrated, the invention is not so limited. Any number (n) may be used including funds investing in synthetic currencies such as ECU's. The mutual fund may also establish its own synthetic currency or currencies based upon composition of the mutual fund portfolios under management.

The Fund Accountant 120 is responsible for maintaining the mutual fund portfolio records together with its accounting records, such as general ledger and the like. Its responsibilities include valuation of each of the portfolios, calculating the net asset value and income distribution for daily dividends. The Fund Accountant 120 communicates with the Investment Advisors 118 for purposes of providing net investment information. As illustrated in FIG. 1A, the Fund Accountant receives transaction data from the Transfer Agent 114.

The financial network, in accordance with this invention, employs Investment Advisors located internationally. In the example of three currency portfolios maintained in U.S. Dollars, Pounds Sterling, and Yen, three individual Investment Advisors will be employed by the financial network. Each Investment Advisor will have a corresponding banking relationship with the Custodians, that is the banks associated with each currency portfolio that is maintained. The functions of these components in the system will be explained in greater detail by considering basic transactions demonstrating operation of the financial network.

The basic types of transactions that are allowed in the financial network and each of their flows throughout the system will be discussed in more detail. Generally, they are as follows. Purchase transactions involve the purchase of shares with cash or in kind with eligible securities approved and valued by the Investment Advisor.

Redemptions redeem shares for cash or in kind with eligible securities approved and valued by the Investment Advisor. Transfers involve moving shares in one portfolio from one shareholder to another.

Matched transfers are effected when two shareholders come to an agreement outside of the system to exchange shares in two different portfolios. They both submit a matched transfer instruction to effect simultaneous transfers of the agreed upon number of shares between accounts in two different portfolios. For example, shareholder A moves U.S. Dollar shares to shareholder B's U.S. Dollar account while shareholder B moves Yen shares to shareholder A's Yen account.

Expedited transactions will extend the cutoff times for submitting instructions for normal payout for a specified fee. And, finally, contingent transactions link two transactions so that after the first part of the transaction is completed, the second part will be processed immediately. Transactions are processed in the system in the following frequency:

Transfers (on a continuous basis as received)
Purchases (every portfolio pricing)
Redemptions (every portfolio pricing)

To the extent that pricing is considered to be continuous, purchases and redemptions would be processed continuously.

Within each category, transactions are processed on a first-in basis and time-stamped at each stage of processing.

Certain elements of each flow are common to all types of transactions. The shareholder will access the financial network through a workstation 100, located at the customer site, and enter appropriate passwords that denote an authorized subscriber. Instructions will be entered and edited via the menu driven software provided for the workstation. A communications link is established with the Client Services and Administration system in order to transmit those instructions.

Figure 6A:
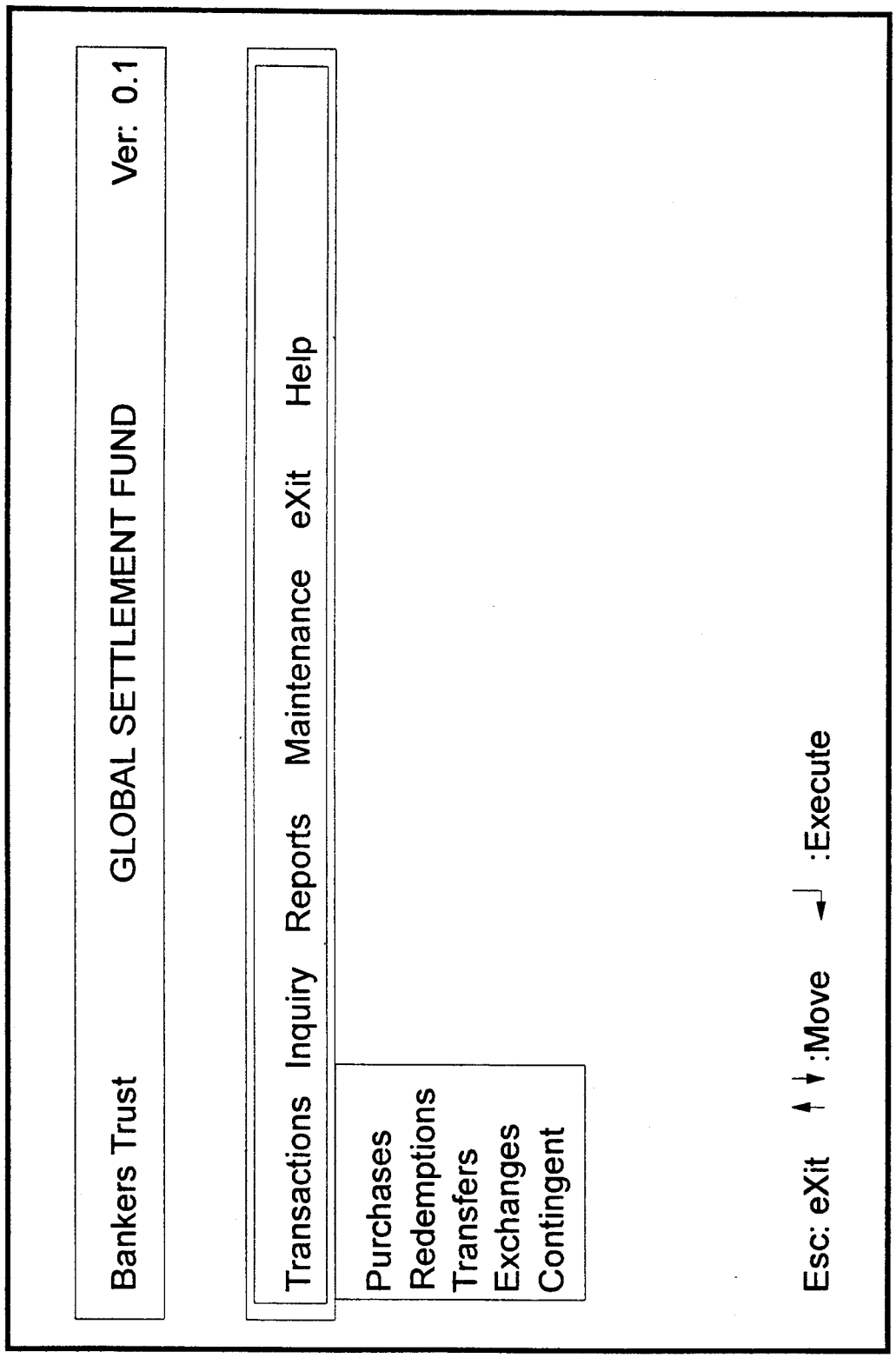

At the workstation 100, the shareholder utilizes the workstation menu, illustrated in FIG. 6A, to select a particular transaction type. A data entry screen will prompt the shareholder for required data and the shareholder will enter the appropriate information. For the purposes of his own tracking, the shareholder will also assign a unique client reference number which remains with the transaction throughout the flow. The shareholder at workstation 100 reviews his information, then utilizes a communications link with the Client Service and Administration (CSA) system 110 and transmits the instruction. For all transactions, the CSA will review the instruction received from the shareholder 100 and check for syntax error and content validity. For some transactions, the CSA system 110 will also check for a sufficient share balance by inquiry to the database 112 or to determine whether the transaction is timely, as in the case of expedited transactions. If for any reason the instruction is not valid, it will be rejected and the CSA 110 will issue an appropriate error message to the shareholder workstation. An audit trail of all rejected messages will be sent to the electronic mailbox for each shareholder who was party to the transaction.

Once an instruction has been received and validated, the CSA 110 will assign a transaction number to that instruction. This transaction number generated by the system is separate from the client reference number. The instruction will then be time-stamped and tagged that it has been accepted. Validation of an accepted instruction will be sent to the shareholder workstation 100, thus indicating to the subscriber that the transaction has been accepted for entry into the system. Once approved by the CSA, the transaction will be time-stamped and tagged, then either transmitted to the Transfer Agent system 114 as in the case of transfers, or put in a pending queue, as in the case of purchases and redemptions.

At the same time, a communication link is utilized between the CSA 110 and the appropriate Custodian 116 for purposes of providing instructions to the Custodian to receive funds or securities, in the case of purchase transactions.

Transactions that are put into a pending queue, i.e. those that are dependent on receipt of information from other shareholders or receipt of good money, for example, are checked periodically to see if they meet the criteria for transmission to the Transfer Agent system. With regard to certain transactions, as will be described, the shareholder is notified at the end of a specified period that required events have not occurred, and after a further specified period the transaction will be deleted if said events still have not occurred and an ensuing message will be sent to the shareholder mailbox to indicate same.

When these transactions are approved, they are time-stamped and tagged by the CSA system 110 which releases approved transactions for purchase and redemption to the Transfer Agent 114 on a periodic basis during the business day, generally to coincide with the next determined Net Asset Value calculation of the portfolio.

When the Transfer Agent 114 receives approved transactions from the CSA system 110, it provides the functions of updating shareholder records to complete the transaction request and then time-stamps and tags those transactions as completed. Next, the Transfer Agent 114 system dynamically provides updated transactional information to the data base 112 and provides investment information at a portfolio level to the Fund Accountant 120. Finally, the Transfer Agent 114 provides a communication function back to the CSA system 110 to acknowledge completed transactions, then sends identical confirmation to generate the UCC required hard copy for the shareholder. Thus, the above characteristics are generic to transaction flows.

Figure 2:
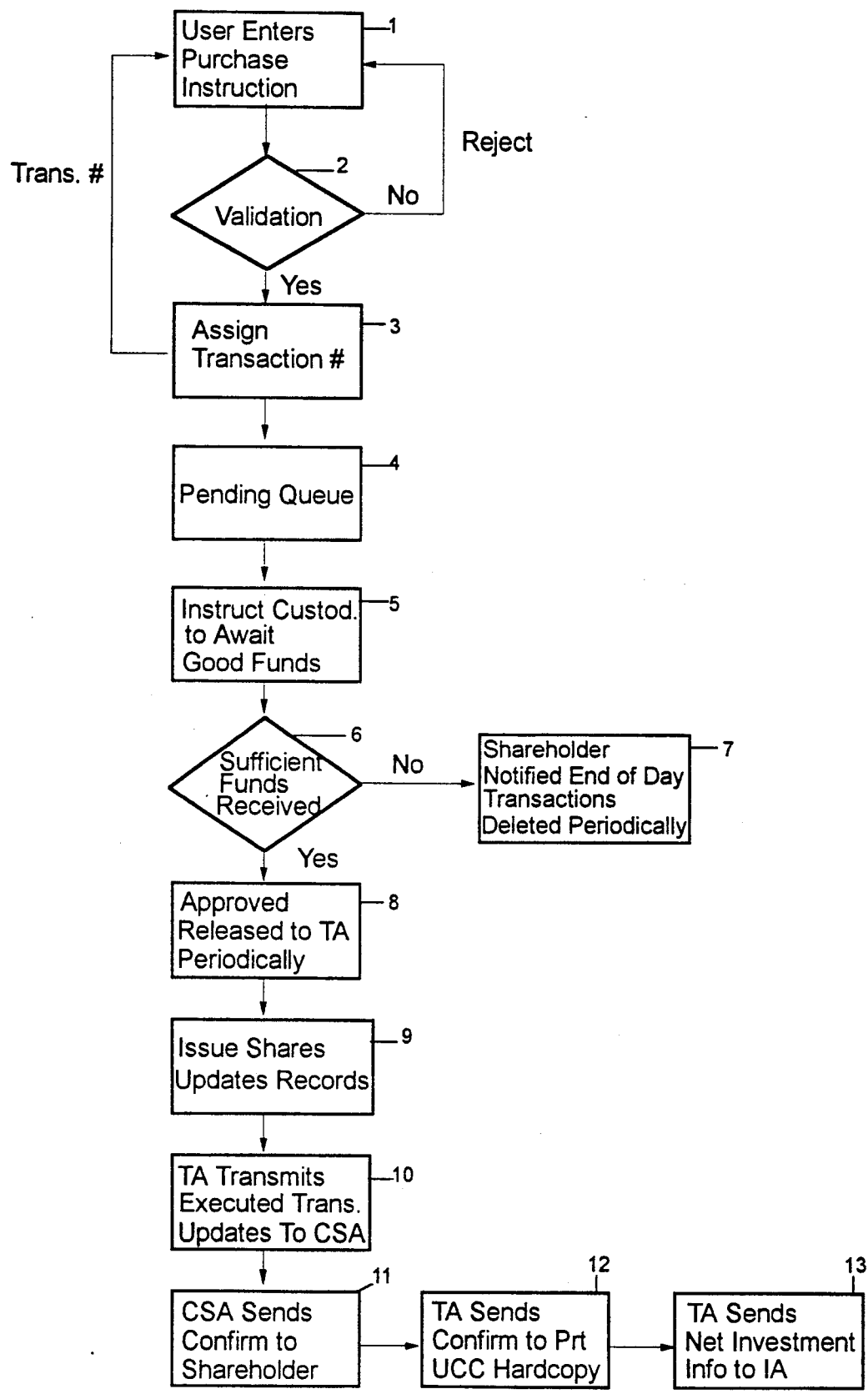
FIG. 2 is a flow chart illustrating the transaction flow for a share purchase.

Referring now to FIG. 2 and the menu illustrated in FIG. 6B, the transactional flow for a purchase of shares is depicted. Shares of the mutual fund, which operates with parallel currency portfolios, may be purchased from the mutual fund by payment of the purchase price in the selected portfolio's designated currency. Thus, U.S. Dollar shares are paid for in U.S. Dollars, pound shares in British Pounds and the like. All purchases of a portfolio's shares for a national currency must be paid by a recognized electronic inter-bank payment system, or book entry on the books of the Custodian, or other designated depository institution in the Portfolio's designated currency directed to the mutual fund's account. Payments will not be deemed to be received by the mutual fund until the Custodian is deemed to have disbursable funds.

In FIG. 2, at processing block 1 the user accessing the workstation 100 will enter purchase information as prompted by the selected data input screen (see FIG. 6B). Thus, utilizing the menu driven system, the user will, once passing security, enter information to effect a purchase instruction. When selected, the screen will automatically reflect the name and account number of the shareholder who has signed on. The shareholder then selects the desired currency portfolio, any one of the portfolios currently managed by the mutual fund. By way of example, this could be U.S. Dollars. British Pounds or Japanese Yen. The number of shares to be purchased is entered using the screen of FIG. 6B. The shareholder then will enter the name of the bank from which the designated currency for payment will be transmitted, and other relevant identifying information and assigns his own unique client reference number. Once reviewed, the shareholder establishes a communications link with the CSA system 110 after passing through the CSA system security checks, transmits the purchase instruction to the mutual fund.

Decision block 2 validates the incoming purchase request against a customer file to insure authorized customer name and account number and for syntax and content validity. If the instruction does not pass the checks, it is rejected and an appropriate error message is sent to the shareholder at workstation 100 along with an audit trail to the shareholder mailbox residing on the CSA 110. If the instruction passes the checks, then it is timestamped at functional block 3 and assigned a transaction number. The transaction number is electronically sent to the shareholder as confirmation that the instruction has been accepted and for tracking purposes.

The accepted purchase instruction is moved to the pending queue shown in functional block 4. The instruction is held here pending acknowledgement of receipt of good funds by the Custodian. It is a unique feature of this financial network that no mutual fund shares will be issued to a subscriber until both a valid instruction and the corresponding disbursable funds arrive. The pending queue is checked on a first-in basis by the CSA who notifies the Custodian shown at functional block 5 to await good funds. Decision block 6 is a check to see if sufficient funds have been received periodically, the on-line connection to the Custodian is checked to verify that funds have been received. If the test proves "No". (block 7) and if funds are not received by a specified period of time, a message is automatically sent to the customer mailbox indicating non-receipt of funds. If money is not received within a further specified period of time from receipt of the instruction, it is automatically deleted and a message is sent to the customer mailbox indicating the action.

If sufficient funds have been received, the flow passes to functional block 8. The Purchase transaction is tagged by the system as approved and time-stamped. Approved transactions are released to the Transfer Agent system 114 work queue at the next scheduled pricing period. At functional block 9, the Transfer Agent system accesses the next approved transaction on a first-in basis, issues the appropriate number of shares based on the current pricing and posts information to the shareholder's account.

At functional blocks 10, and 12, the confirmation trail of the purchase is completed. Once the shareholder records have been updated. (functional block 10) the Transfer Agent system tags the Purchase transaction as completed and time-stamps the transaction. Executed transaction updates are then transmitted to the CSA system. That is, the Transfer Agent system will update the CSA system data base 112 with the most recent transactional information. In turn, the CSA system will transmit electronic confirmation to the shareholder's mailbox which can be accessed from workstation 100. The Transfer Agent 114 will send an identical confirmation to generate the UCC required hard copy, thereby providing the shareholder a paper trail of the purchase.

At functional block 13, the Transfer Agent system compiles the total amount of purchases by portfolio, nets that amount with redemptions and sends netted purchase and redemption information to Fund Accountant 120.

Figure 3:
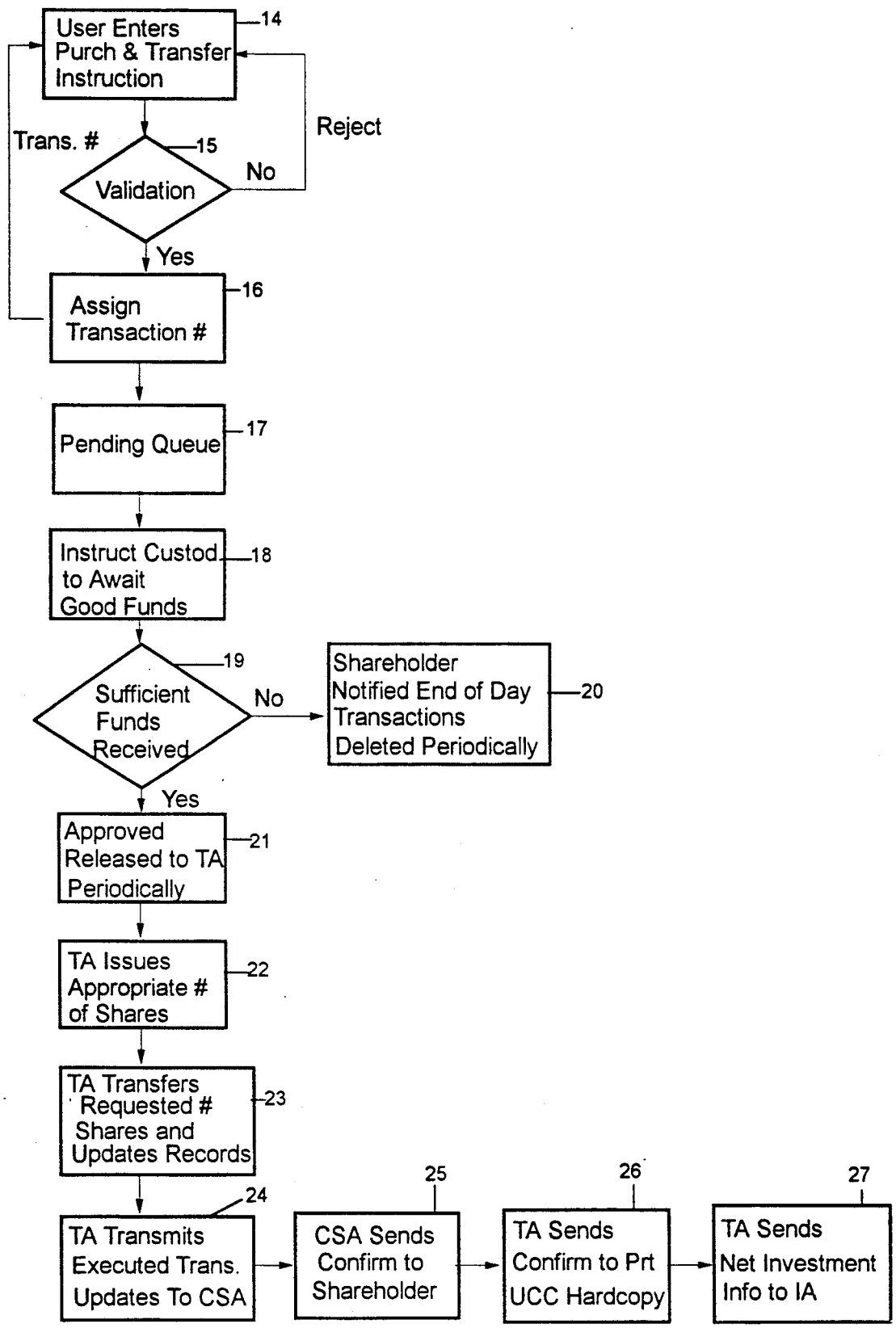
FIG. 3 is a flow chart indicating the transaction flow for a share purchase and transfer.

Referring now to FIG. 3, a two-step transaction involving purchase of shares and their immediate transfer, herein called a Purchase and Transfer, is depicted.

At functional block 14, the shareholder utilizing the workstation 100 will enter the same data as required for a purchase instruction and additionally specify the number of shares and the account to which the shares will be transferred once purchased. This transaction, a purchase and transfer of shares, will be used typically for purposes of settling commercial or financial obligations. It allows the shareholder at a remote workstation 100 to execute in a single instruction a two-step process of purchasing shares and transferring them immediately upon issue to the designated account. This technique thus frees the shareholder from having to periodically check his mailbox for confirmation of a purchase before he can initiate a transfer of shares to another party.

As in the case of a purchase transaction, the CSA performs the same steps at blocks 16, 17 and 18 as in the case of the purchase (blocks 3, 4 and 5). The Custodian at block 19, looks to see if sufficient funds have been received. Periodically, the on-line connection to the Custodian is checked to verify that funds have been received. If the test proves "No" (block 20), and if funds are not received by a specified period, a message is automatically sent to the customer mailbox indicating non-receipt of funds. If money is not received within a further specified period from receipt of the instruction, it is automatically deleted and a message is sent to the customer mailbox indicating the action.

If sufficient funds are received by the Custodian, the approved transactions are released to the Transfer Agent, (block 21). Then, the Transfer Agent will issue the shares to the shareholder account at block 22. Block 23 in FIG. 3 is the transfer function. In the case of this instruction, the Transfer Agent, having issued the appropriate number of shares, will then transfer the requested shares to the account of the designated recipient. Information will be posted to the account of the shareholder who initiated the purchase and transfer transaction as well as updating the account of the designated recipient of the transfer. Thus, at block 24, executed transaction updates are transmitted to the CSA system. This updated information sent to the CSA reflects both the purchase and the transfer of shares. At block 25, confirmation is sent to both shareholders the purchase and transfer shareholder and the recipient of transferred shares. Block 26 completes the paper audit trail as in FIG. 2 block 12, thus the Transfer Agent system sends an identical confirmations to generate the UCC required hard copy, thereby providing the shareholders a paper trail of the transaction. Functional block 27 shows that the Transfer Agent system compiles the total amount of purchases by portfolio, nets that amount with redemptions and sends net investment information to Fund Accountant.

Figure 4:
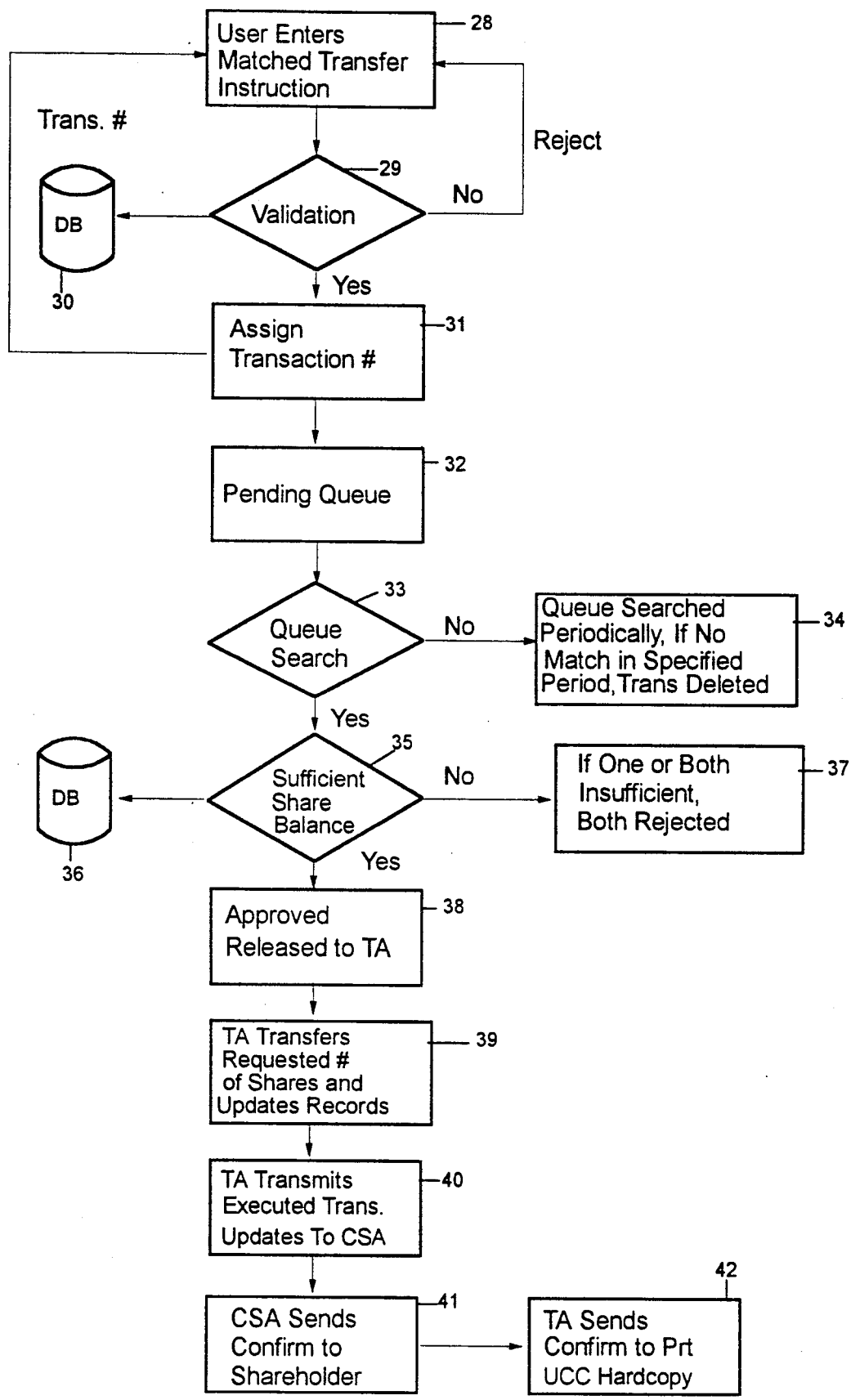
FIG. 4 is a flow chart illustrating the transactional flow for a matched share transfer.

Another important aspect of this financial transaction network is the use of the matched transfer transaction. FIG. 4 depicts the flow of this transaction and the data entry screen is illustrated in FIG. 6C.

Matched transfers are effected when two shareholders come to an agreement outside of the financial network to exchange shares in two different portfolios. They both submit a matched transfer instruction to effect simultaneous transfers of the agreed upon number of shares between accounts in two different portfolios. For example, shareholder A moves U.S. Dollar shares to shareholder B's U.S. Dollar account while shareholder B simultaneously moves Yen shares to shareholder A's Yen account.

Shareholders wishing to effect a matched transfer can post information with respect to desired exchanges utilizing the electronic bulletin board 124 which is maintained 24 hours a day. A shareholder at workstation 100 can scan the bulletin board 124 to determine whether there are potential buyers or sellers in the portfolios of interest. Upon finding a potential counterparty (another shareholder to exchange with), the shareholders negotiate the terms of the transaction outside of the financial network by phone, facsimile transmission or other external means.

Once the terms of the matched transfer are agreed upon, both parties must select a matched transfer instruction from the main menu at workstation 100, enter required account information, the party with whom they will do a transfer (the counterparty), the desired portfolios, and the agreed upon number of shares to be transferred in each portfolio.

The two parties will agree on a unique client reference number which will be entered on both screens. Once checked by the shareholders these two instructions will be sent to the CSA system 110.

The instruction from the transferring party is checked at blocks 29 and 30. First the instruction is checked against a customer file to insure authorized customer name and account number and for syntax and content validity. If the instruction does not pass the checks, it is rejected and an appropriate error message is sent to the customer.

As in the case of other transaction types, if the instruction is valid it is assigned a transaction number by the CSA at block 31. The accepted Matched Transfer instruction is moved to the pending queue shown in functional block 32. The instruction is held here pending arrival of a matching transaction. Thus, the authority to initiate the transfer is held by the CSA processor which checks the queue periodically to determine whether a matching instruction is received.

At block 33, the pending queue is searched for a matching transaction identified by the same unique client reference number. If a matching transaction is not found within a specified period of time, the Matched Transfer request is rejected and a message is automatically sent to the shareholder mailbox.

Once a matching transaction has been found, both requests are put through another check against the data base (block 36) to see that each shareholder has sufficient share balance needed for transfer. If one or both parties do not have sufficient shares available, both sides of the Matched Transfer (functional block 37) are rejected and a message is automatically sent to each shareholder's mailbox.

If sufficient available shares have been verified at block 38, the CSA system tags each transaction as approved, time-stamps each transaction and releases approved transactions to the Transfer Agent system 114. The Transfer Agent, as shown in functional block 39, transfers the requested number of shares in the desired portfolios between the designated parties and posts information to the shareholders accounts. Once the shareholder records have been updated, (functional block 40) the Transfer Agent system tags the Matched Transfer transaction as completed and time-stamps the transaction. Executed transaction updates are then transmitted to the CSA system. Functional block 41 shows that the CSA system sends an electronic confirmation to each shareholder mailbox. As required, the Transfer Agent 114 will send and identical confirmation in the form of hard copy to each shareholder.

As can be appreciated, by utilizing this transaction type shareholders can arrange for currency exchanges by swapping, at agreed upon rates, shares within their respective currency portfolios. Such a currency exchange by swapping shares is effectuated without the use of intermediary banks. The result is a more expeditious access to funds without the imposition of interbank transfer fees, the inherent delays and risks in the interbank settlement system and the like. This financial transaction network thus provides for electronic transfers of currency shares utilizing the flexibility of multiple mutual fund portfolios in discrete currencies.

Figure 5:
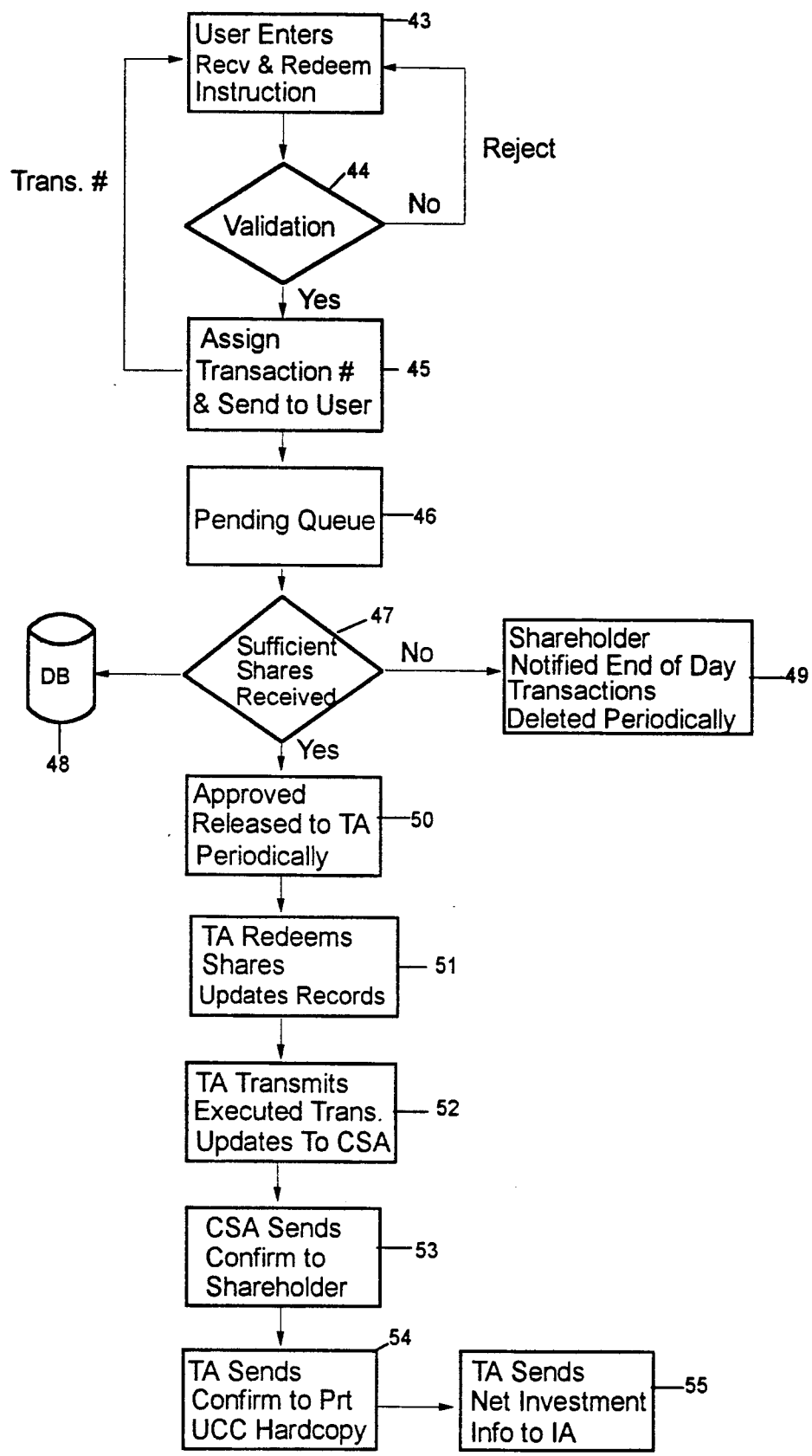
FIG. 5 is a flow chart illustrating the transactional sequence for a share receive and redeem transaction.

FIG. 5 illustrates another two-step transaction utilizing the financial network of this invention, an instruction to receive and redeem shares. It is used when a shareholder wishes to redeem shares of a portfolio, but is waiting to receive a transfer from another shareholder. Thus, the shareholder expects to receive shares from another source and then redeem a specified number of those received shares.

At functional block 43, the shareholder at workstation 100 will enter the system passing security checks and the like. Utilizing a screen such as the one illustrated in FIG. 6D, the shareholder selects the desired currency portfolio and indicates the number of shares to be redeemed. The shareholder also indicates the bank, and other identifying information, into which the designated currency will be transmitted once redeemed. A unique client reference number is then given to this instruction. Once reviewed and approved the shareholder transmits the instruction to the financial network.

As in the case of other transactions, the instruction is checked to determine whether it is valid. If rejected due to incorrect syntax or content validity, an error messages is sent to the shareholder. If accepted, the CSA 110 assigns a transaction number and transmits such to the shareholder indicating that the instruction is valid. The instruction is then held in the pending queue at block 46 pending receipt of shares. The queue is accessed periodically at decision block 47: that is, the data base 112 is accessed to see whether it has been updated to indicate that the expected number of shares has been received and credited to the shareholder's account. Thus, a check of the database 112 is made to determine if the required number of shares have been received and are available for redemption. At the end of a predetermined time, if insufficient shares are in the shareholder's account, the transaction is cancelled. That is, the queue is refreshed by purging expired instructions, and the shareholder is notified with an ensuing message to the shareholder mailbox.

If sufficient shares are received within the specified period, the CSA 110 will tag the receive and redeem transaction as approved, time stamp the transaction and release approved transactions to the Transfer Agent system 114 at the next pricing period. The Transfer Agent system at block 51 will redeem the shares now in the shareholder's account and post that information to the shareholder account by updating the database 112.

The CSA system also receives an indication that the transaction has been executed, and the shareholder receives both electronic confirmation sent to his mailbox and identical hardcopy generated by the Transfer Agent system. The Transfer Agent system completes the chain by netting purchases with redemptions and sending net investment information to the Fund Accountant.

As is therefore apparent, by utilizing the receive and redeem instruction, a shareholder can use the financial network for purposes of effectuating near real-time use of redeemed shares. That is, without the requirement of intermediary banks and intra-bank transfers, mutual fund shares can be received from third party sources and promptly redeemed into the currency used by that portfolio. The time based availability of funds is therefore expedited and traditional passing fees minimized.

The preceding description of four typical transactions is illustrative of basic operations of this system. It is apparent that other types of transactions are within the scope of this invention. For example, in addition to a regular purchase of shares, a purchase-in-kind can also be effected. This would be a purchase of shares in a particular portfolio for which the consideration would not be cash but rather securities which are deemed to be permissible investments by the investment advisor for that portfolio. Analagously, redemptions-in-kind are also a recognized transaction type. Also, while a description of a matched transfer is discussed as an example, it is apparent that a regular exchange, that is a currency conversion from an investment of shares of one portfolio into shares of another portfolio is within the scope of this invention. FIG. 1B illustrates such an "exchange" whereby shares are redeemed from one portfolio, the redemption proceeds converted through foreign currency exchange procedures into the designated currency of another portfolio, then shares are purchased with the proceeds of the currency conversion.

Yet another example of the flexibility of this system is the use of the invention for purposes of two-step transactions. In addition to the purchase and transfer transaction and the receive and redeem transaction, a receive and transfer transaction can also be effectuated. This occurs when a shareholder wishes to transfer shares of a portfolio, but is waiting to receive a shares from another shareholder. The transaction is a two step process whereby the system awaits receipt of the transferred shares, then permits the receiving shareholders to transfer those shares as specified.

The system also allows for expedited transactions as in the cases of an expedited redemption and expedited exchange. Expedited redemptions may be accepted only during specified hours depending on the requirements of a particular portfolio and will result in the redemption of shares in a shorter timeframe than in the normal course of a redemption as specified in the prospectus. These transactions are subject to a fee for expedited transactions.

Another important aspect of this invention is the improved access to data for purposes of inquiry and reporting. The shareholders utilizing the workstations 100 can make inquiries into the status of their account by a network inquiry. FIG. 6E illustrates a typical menu for database inquiry at the shareholder level. Also, real-time queuing of instructions is maintained through the system such that a shareholder can at any time know the status of transactions in terms of their status in the system.

Flexibility is also obtained by allowing a shareholder to distribute dividends directly to beneficial owners for whom the shareholder is acting. That is, for example, when a clearing house holds shares which have been put up as collateral by a clearing member, the clearing house can distribute dividends on that collateral back to the clearing member.

Additionally, by reviewing a bulletin board maintained by the mutual fund, shareholders obtain information relative to the requests of other shareholders with respect to secondary market transactions. It will be appreciated that this is operated 24 hours a day, it can be utilized internationally with great flexibility by all shareholders to the system.

At the host system, the Client Service and Administrative functions allow access for purposes of reading and updating transaction queues. Inquiries regarding transaction records are fulfilled on a real-time basis. The Transfer Agent is responsible for its own shareholder record keeping and dynamically updating the CSA data base. Importantly, however, the Fund Accountant does not have access to shareholder records. That is, the Fund Accountant 120 is locked out of the data base 112. This security protection insures independence of the Fund Accountant by having its activities pass directly to the Transfer Agent for purposes of accounting details and verification.

With this invention the improved reporting is also effectuated. At the shareholder level both electronic confirms to shareholder mailboxes and confirmations required by the Uniform Commercial Code are provided. The shareholder also receives periodic statements listing transactional and account information. Management reports regarding financial network performance provide fund data on a portfolio-by-portfolio basis along with data concerning shareholder activity. Tax and regulatory reporting is provided as well. It can thus be appreciated that given this system architecture, important advantages accrue to shareholders. Other uses will be apparent to those skilled in the art.

The transactions thus described are illustrative of this invention. Transactions such as purchases or redemptions are conducted using a fund comprised of a single currency. The invention thus permits the use of mutual fund shares in a single currency to effectuate the settlement of commercial transactions in that currency.

In practicing this invention, the assets of a portfolio are unrelated to the functioning of the financial network. Country of registration of the funds is not germane to the operation of the fund. While described in the context of multiple portfolios, the invention is applicable to multiple funds.

Modifications of this invention may be practiced without departing from the scope thereof.

Use of the fund's portfolios as currency equivalents is not diminished by any discounts applied by regulatory or by designated self-regulatory entities.

For example, this invention can also be used to facilitate the exchange of those currencies (national or otherwise), which are currently inhibited from being exchanged by practice, economics or statute, by providing securitization of the currency as a mutual fund share. Securitization is obtained by equating a unit share of a portfolio to the unit, or fraction or multiple, of the associated currency to be securitized. This will allow currencies to be exchanged via their securitized representation without violating existing statutes concerned with the actual transfer of currency itself (such as the Johnson Debt Default Act in the case of rubles), and will potentially circumvent issues of practice or economics associated with the currency by allowing the market to set the exchange rate on the securitized version of the currency via the bulletin board of this invention.

This invention can be used as a supplement or replacement for many of the current bank practices concerned with the exchange of currencies through the mechanism of foreign exchange. It can also be used to effect the transfer of different currencies between shareholders of this financial transaction network via the matched transfer transaction, thereby eliminating the possibility of outright loss in foreign exchange settlement (known as the "Herstadt effect"). This invention can also be used as a multi-currency guarantee fund for those foreign exchange netting systems engaging in bilateral or multilateral netting by novation which maintain a guarantee fund to assist in insuring settlement in case of member default.

This invention can further be used as a collateral type for pledging to or depositing in guarantee funds in general. This would include, but not be limited to, private and central bank collateral pools used as a basis for determining the creditworthiness of a participant, or size or number of payments a participant is allowed to effect.

It will be appreciated that this invention can also be used by shareholders as a settlement tool in a mode known as "delivery versus payment" to insure the safe and orderly settlement of any asset permitted in any portfolio. Such settlement would be effectuated through transactions known as receipt-in-kind and delivery-in-kind.

These additional uses are indicative of the scope of this invention and are not limiting examples.

Having described the invention, I claim:

1. A financial network for facilitating commercial transactions with immediate finality of settlement through the use of mutual fund shares as currency equivalents comprising:
    a plurality of shareholder workstations:
    a host processor accessed by said shareholder workstations for processing transaction instructions and maintaining account status information:
    said host processor including database means for maintaining records of shareholder accounts including transactions:
    means for establishing (n) currency portfolios, said portfolios each managed by an investment advisor, said shareholder workstations accessing said host processor to effectuate instructions for making transactions in any of (n) portfolios, means linked to said host processor to provide information on receipt of shareholder assets, and transfer agent means responsive to said host processor for completing transactions having immediate finality of settlement when authorized by said host processor, said transfer agent means updating said database with data on completed transactions.

2. The financial network of claim 1 further comprising an electronic bulletin board, said electronic bulletin board accessed by said shareholder workstations for viewing and transmitting information on potential transactions.

3. The financial network of claim 1 wherein said (n) currency portfolios comprise at least two currency portfolios each investing in a different currency.

4. The financial network of claim 3 wherein said transaction instruction is a transfer of shares between different shareholders in two different portfolios.

5. The financial network of claim 4 further comprising means at shareholder workstations to initiate a transaction instruction initiated by each of two shareholders for a matched transfer of shares whereby shares in one of (n) currency portfolios are transferred from a one shareholder to a second shareholder while simultaneously shares in another of (n) currency portfolios are transferred from said second shareholder to said first shareholder, based on an agreement between said shareholders negotiated outside of the financial network.

6. The network of claim 3 further comprising means at a shareholder workstation for entering data to initiate an exchange of shares from a first account of a shareholder in one of said currency portfolios to shares in a second account of said shareholder in another of said currency portfolios based on a current rate of exchange between currencies in said portfolios by means of a redemption in the portfolio of the first account and a purchase in the portfolio in the second account.

7. The financial network of claim 1 further comprising means at a shareholder workstation for entering data to initiate a transaction instruction to said host processor to purchase shares for said shareholder's account in one of said (n) currency portfolios.

8. The financial network of claim 1 further comprising means at a shareholder workstation for entering data to initiate a transaction instruction to said host processor to redeem shares from said shareholder s account maintained in one of said (n) currency portfolios.

9. The financial network of claim 1 further comprising means at a shareholder workstation for entering data to initiate a transaction instruction to said host processor to transfer shares from one account to another account.

10. The financial network of claim 9 wherein said transaction instruction is a transfer of shares between different shareholders in one of said (n) currency portfolios.

11. The financial network of claim 1 further comprising fund accountant means, said fund accountant means receiving from said transfer agent means and said investment advisor data on assets held for determining the value of said assets to compute dividends payable to shareholders for each of said (n) currency portfolios.

12. The financial network of claim 1, wherein said transfer agent means operates to achieve finality of settlement of said transactions at any time of day.

13. The financial network of claim 1 further comprising security means to validate, accept or reject and route transactions between said host processor and said shareholder workstations.

14. A method of effectuating settlement of commercial transactions using a host based computer system having remote workstations in a network comprising the steps of:
  establishing at least one mutual fund portfolio investing in assets denominated in a currency and having a custodian to hold assets of the portfolio with the portfolio managed by an investment advisor;
  establishing multiple shareholder accounts and providing shareholder access into said mutual fund portfolio for issuing instructions that affect share balances in his account;
  providing a host system serving as a transaction switch acting on instructions issued by said shareholder and maintaining a database of shares owned in said mutual fund portfolio;
  and providing a transfer agent system for said mutual fund portfolio, said transfer agent system executing instructions from said shareholder on a book entry basis and maintaining accountable records of said mutual fund portfolio;
  said shareholder initiating a transaction by issuing an instruction to said host system, said host system operating in response to a valid instruction from a shareholder that shareholder assets are available so that said transfer agent can complete the transaction requested by said shareholder to effectuate settlement of a commercial transaction between shareholder accounts within said mutual fund portfolio.

15. The method of claim 14 further comprising the step of establishing (n) separate mutual fund portfolios which includes at least one mutual fund portfolio and a second mutual fund portfolio, each of said (n) separate mutual fund portfolios investing in a different currency.

16. The method of claim 15 where the instruction comprises the step of requesting the purchase of mutual fund shares in one of said (n) mutual fund portfolios.

17. The method of claim 15 wherein the instruction comprises the step of requesting the redemption of shares in one of said mutual fund portfolios and using the proceeds to purchase shares in another of said (n) mutual fund portfolios, once those proceeds are converted to the designated currency of said portfolio.

18. The method of claim 15 wherein the instruction comprises the steps of requesting the purchase of shares in one of said mutual funds and transferring the shares thus purchased to an account held for the benefit of another shareholder.

19. The method of claim 15 wherein the instruction comprises the steps of two shareholders agreeing on a swap of shares in different ones of said (n) mutual fund portfolios, each shareholder initiating an instruction for a mutual transfer of shares and said host processor matching and validating such instructions.

20. The method of claim 14 wherein the instruction comprises the step of requesting the redemption of shares in said mutual fund portfolio.

21. The method of claim 15 further comprising the step of establishing and maintaining a bulletin board to which shareholder expressions of interest for potential transactions involving shares can be posted and to which inquiries can be made.

22. The method of claim 15 further comprising the step of shareholder inquiry to a bulletin board to determine indications of interest in potential transactions involving shares.

23. The method of claim 14 further comprising the step of said shareholder posting to a bulletin board an indication of interest in potential transactions.

* * * * *